Schuell & Schmitt,
Automatic Fan.
No. 108,637. Patented Oct. 25, 1870.

UNITED STATES PATENT OFFICE.

JOHN SCHUELL AND PETER SCHMITT, OF WATERLOO, ILLINOIS.

IMPROVEMENT IN AUTOMATIC FANS.

Specification forming part of Letters Patent No. 108,637, dated October 25, 1870.

*To all whom it may concern:*

Be it known that we, JOHN SCHUELL and PETER SCHMITT, of Waterloo, in the county of Monroe and State of Illinois, have made certain new and useful Improvements in Automatic Fans; and we do hereby declare that the following is a full and true description thereof, reference being had to the accompanying drawings, and to the letters of reference marked thereon.

The nature of this invention consists in a combination of spring and gearing devices automatically actuated like clock-work, so as to operate a shaft carrying two or more fans and imparting a rotary motion thereto. Furthermore, said invention relates to the manner of adjusting said fans in position to accommodate the user.

Figure 1:
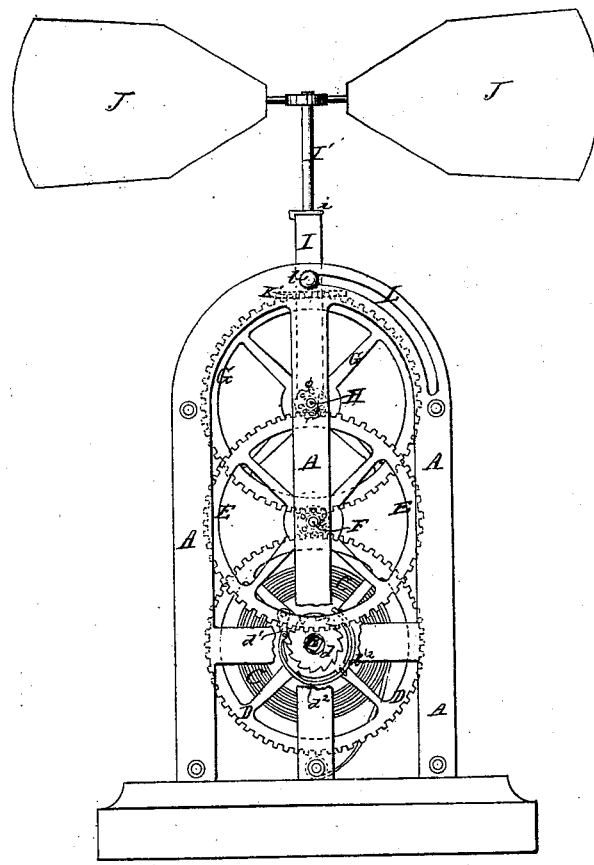
Figure 2:
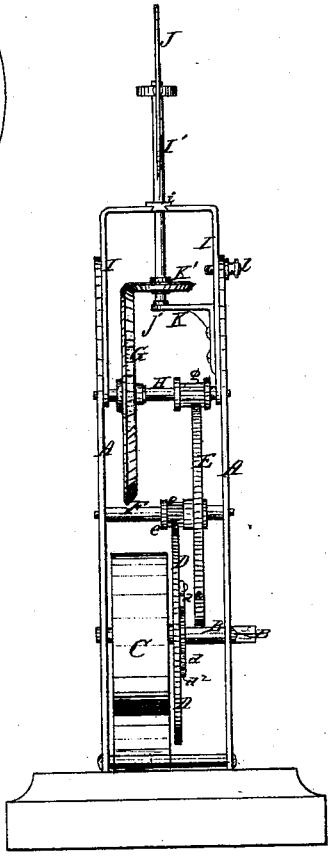

To enable those herein skilled to make and use our said invention, we will now more fully describe the same, referring to the accompanying Figure 1 as a front elevation; to Fig. 2 as a side elevation.

The operative mechanism we support in a suitable metallic frame, A. On the main shaft B the spring C coils, its one end attaching thereto, while the other end attaches to the lower part of the frame or base proper. The shaft B furthermore carries the large spur-gear D, and alongside thereof is the ratchet-wheel $d$ and movable click or pawl $d'$. Said pawl is pressed down to engage in the ratchet $d$ by a spring, $d^2$, secured to the wheel D. The operator, by means of a suitable key placed in the shank of the shaft B, winds the spring C, which acts as a motor to the gear-wheel D. The rotary motion thus achieved is communicated by the gear D to a pinion or "pin-wheel," $e$, and center wheel, E, secured to the shaft F, turning freely by its pivot-journals in the frame A. Similarly the center gear, E, in its turn communicates motion to the pin-wheel $g$ and large bevel-wheel G, secured to the upper shaft, H. On the shaft H we arrange the adjustable standard I, having proper slot and coupling-bearing, $i$, in which the vertical shaft I' is fitted to turn. Said shaft carries at its top the fans J, and by its pivot end said shaft is supported to turn freely in a jewel or other hardened bearing, $j$, arranged in the projecting "step" K, properly secured to the side of the standard I. In order that said shaft I' (carrying the fans) may receive the imparted rotary motion, we have provided said shaft with a small bevel-wheel, K', arranged to gear with the larger bevel-wheel G. By such a construction of parts it is plain that rotary motion is imparted to the respective gear and bevel wheels, and in turn communicated to the shaft carrying the fans; also, that the operation of these gearing devices is effected without noise or discomfort.

The top of the frame A has a segmental slot, L, as shown in Fig. 1. A set-screw, $l$, engaging in said slot and impinging against the fan attachment I, retains the same in a vertical position; or the operator may adjust the fans in position at any angle in the slot L to accommodation.

The fans J are constructed of any suitable material and form, and simply secured by their screw-threaded arms in the "hub" attached to the shaft I'.

Having thus fully described our said invention, what we claim is—

The arrangement of the adjustable fan attachment I, bearing shaft I', carrying the fans J, when constructed to operate with clock-work machinery, substantially as set forth.

In testimony of said invention we have hereunto set our hands in presence of witnesses.

JOHN SCHUELL.
      PETER SCHMITT.

Witnesses:
 WILLIAM W. HERTHEL,
 ROBERT BURNS.